Oct. 3, 1961  E. T. HOLLAND, JR  3,002,635
CONVEYOR AND SYSTEM
Filed June 17, 1957  3 Sheets-Sheet 1

INVENTOR
EDWARD T. HOLLAND, JR.
BY
Curtis, Morris & Safford
ATTORNEY

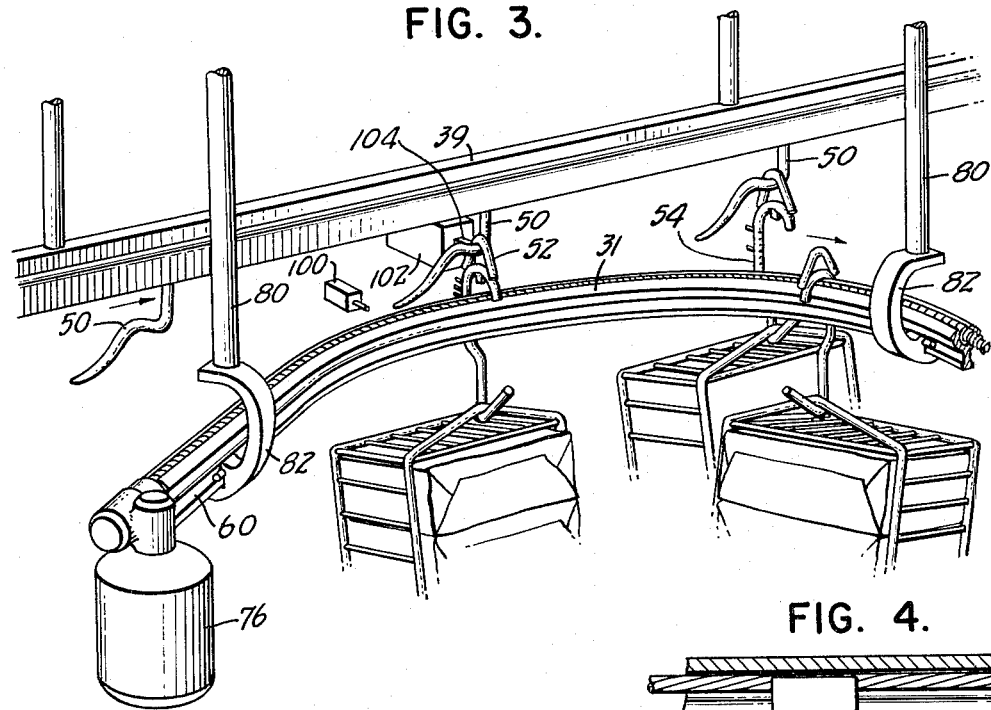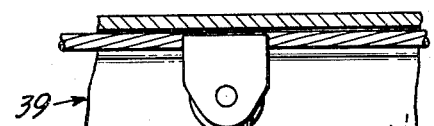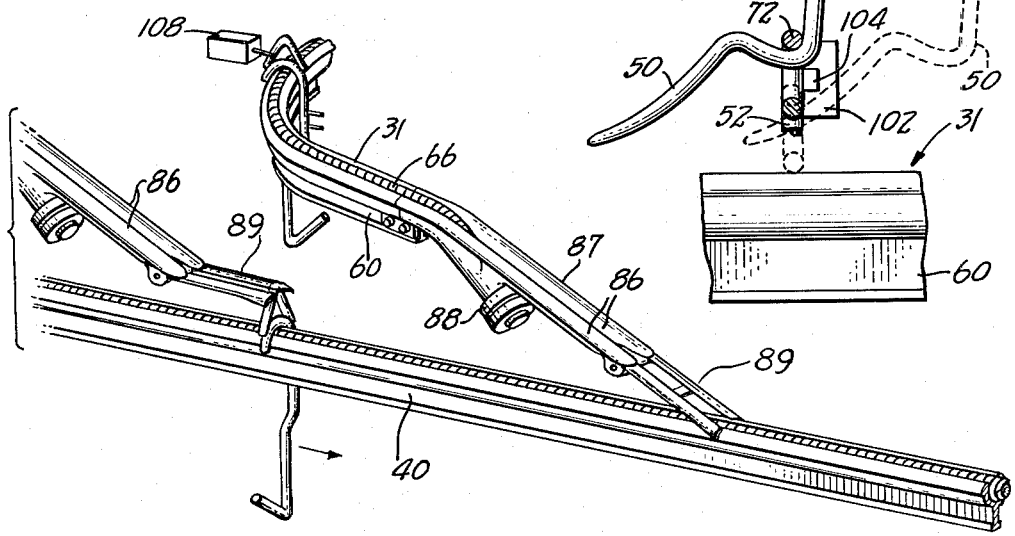

Oct. 3, 1961 E. T. HOLLAND, JR 3,002,635
CONVEYOR AND SYSTEM
Filed June 17, 1957 3 Sheets-Sheet 3
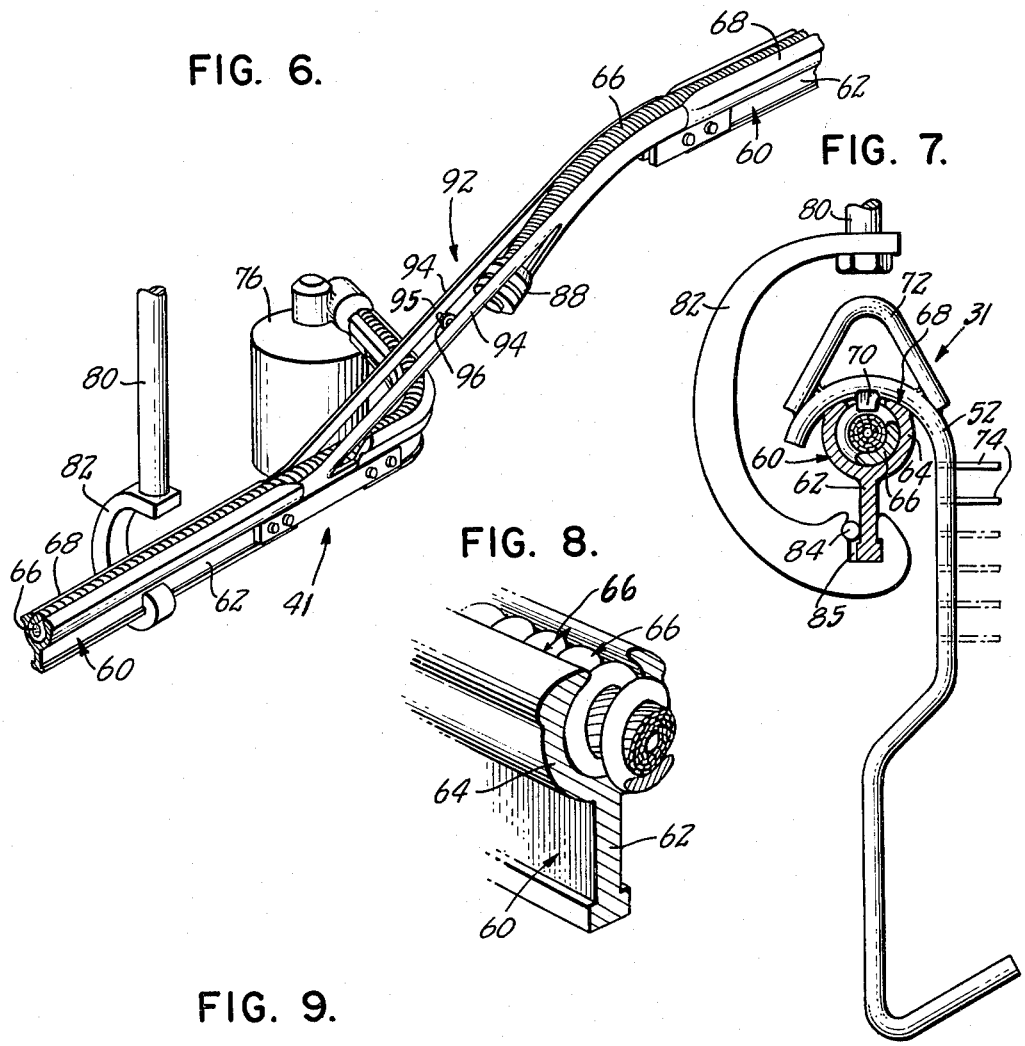
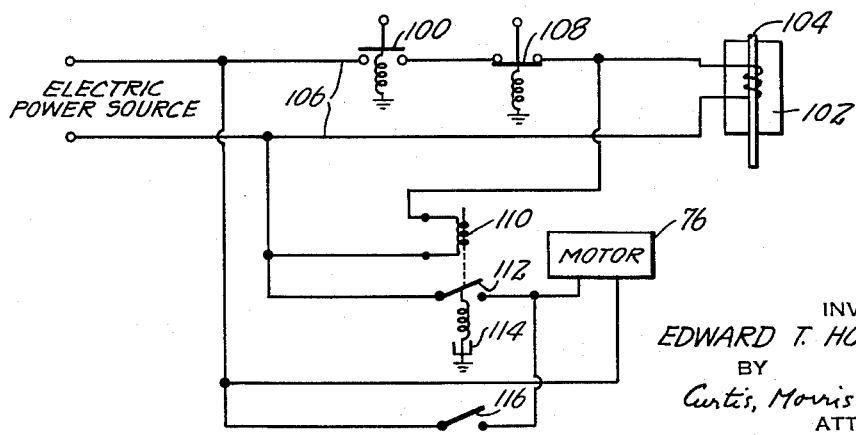
INVENTOR
EDWARD T. HOLLAND, JR.
BY
Curtis, Morris & Safford
ATTORNEYS United States Patent Office 3,002,635
Patented Oct. 3, 1961

3,002,635
CONVEYOR AND SYSTEM
Edward T. Holland, Jr., Englewood, N.J., assignor to Cherry-Burrell Corporation, Cedar Rapids, Iowa, a corporation of Delaware
Filed June 17, 1957, Ser. No. 666,023
2 Claims. (Cl. 214—16)

This invention relates to conveyors and systems, and more in particular to apparatus for the handling and storage of products during processing thereof or before or after the processing.

An object of this invention is to provide improved, low cost conveyors and systems adapted for completely automatic operation.

Another object is to provide conveyors and systems using pre-fabricated components, parts and which can be assembled as required to produce a complete unit to suit the specialized needs of an individual user.

A further object is to provide a conveyor having a very great load carrying capacity, but which occupies only a small amount of space and requires no bulky supporting or driving equipment.

Still another object is to provide a conveyor which can be operated under severe temperature conditions, and which is mechanically rugged, extremely reliable, efficient and adaptable to meet many different conditions of installation and use.

A more particular object is to provide a conveyor and system which can be operated completely automatically to freeze and to store ice cream in a hardening room.

These and other objects will be more fully understood from or pointed out in the description given hereinafter.

In designing some conveyor systems, a number of difficult and seemingly contradictory requirements must be dealt with. Perhaps most importantly, the cost of such a system must be kept low enough so that the money invested can be regained by savings in operating cost in a reasonable number of years. No matter how efficient or economical the operation of a conveyor may be, if the cost of installation would require a capital outlay requiring ten years to amortize many companies would not be willing to invest their funds in the system, especially since new technical developments might make the conveyor obsolete in only a few years.

Though it might seem a simple problem to make a conveyor strong enough and powerful enough to move a given load in a given time from one place to another, when it is necessary to transfer articles or products from one conveyor section to another and where the conveyor must be installed in inaccessible or cramped places the problems become very difficult. There are additional complications when the load to be moved comprises fragile or heavy articles which must be handled separately or with especial care. Belt-type and other progressively moving conveyors have been very satisfactory as an answer to certain of these problems, but they have proven completely unsatisfactory for solving some such problems. Ice cream freezing or hardening is a fine example of one field where the limitations of the prior conveyors make them generally unsuitable and not completely satisfactory.

Belt conveyors require substantial supports for the moving belts and such supports generally require frequent attention within the entire zone of the conveyor. To install a belt conveyor in a low temperature hardening room is an expensive undertaking because of the complexity of the structure and because much of the very high cost hardening room space, which could otherwise be occupied by the products being hardened, is preempted by the physical structure of the conveyor. Thus for a given ice cream handling capacity, the hardening room must be made larger to accommodate a belt conveyor. Additionally, there are problems in running and servicing complex conveyor machinery of this kind under very cold conditions and so a much better kind of conveyor is needed.

In handling certain kinds of products or articles, such as ice cream, the present invention provides the greatest economy of operation because it is possible to store the products for periods of time without loading or unloading them from the conveyor and without interferring with the movement or storage of other articles on the conveyor system. At the same time, there is completely automatic handling of articles by the conveyor alone, including storage and removal from storage, with a flexibility which in every way matches and in some ways excells the flexibility etc. of manual handling of the articles without the labor costs that would be involved. Therefore, the present invention provides a conveyor and system which achieves the goal of overcoming difficulties of the prior art and also giving advantages previously unobtainable.

A conveyor according to the present invention is of the overhead rail type. Such conveyors in general are capable of carrying relative to their own size and weight very heavy loads per lineal foot because they can take advantage of vertical space. They also are able to carry almost any shape or size of article. This is of prime importance in regard to storage considerations. The specific conveyor of the present invention is superior to previously known ones in that transfer from one section to another is very easy, this making possible the use of a number of separate sections of convenient length able to operate independently of one another. Articles are carried on the conveyor by means of hooks which are separate from the conveyor and which travel along with the articles from one conveyor section to another. There is no need to transfer an article from one hook to another anywhere from beginning to end of the conveyor.

In accordance with one specific embodiment of the invention there is provided an automatic system employing an improved rail-type overhead conveyor by which products or articles can be carried from a production room to a storage room where they can be arranged and stored according to a wide variety of separate classes. The articles can be withdrawn from storage as simply as they are put there, and no manual labor is required to switch or transfer the articles in or out of storage. The first articles in each class in the storage room are the first withdrawn so there is no problem of providing inventory rotation. The load storing and handling capacity of this system is tremendous even though the physical space occupied by the conveyor equipment is quite small. Operation of this equipment, because of its ruggedness and simplicity, is extremely reliable and it is especially suited for operation in very hot or very cold places because it inherently requires only a minimum of attention and servicing. The conveyor sections can be assembled from pre-fabricated parts or components, and yet there may be a special design for each particular installation. The cost of the system, since its component parts can be mass produced and easily assembled, is very low. Automatic warehousing is thus brought within the means of even very small users who cannot afford a large capital outlay.

A better understanding of the invention, together with a fuller appreciation of its many advantages will best be gained from a study of the following description given in connection with the accompanying drawings wherein:

FIGURE 3 is an enlarged view of a portion of the conveyor system at the entrance end of the hardening room;

FIGURE 4 is a greatly enlarged detail of a conveyor hook also shown in FIGURE 3;

FIGURE 5 is an enlarged view of a portion of the conveyor system at the exit end of the hardening room;

FIGURE 6 is a portion of the exit conveyor showing the transfer rails joining the discharge end of one conveyor section to the receiving end of the next section;

FIGURE 7 is an enlarged view of an article-carrying hook showing how it engages a conveyor rail and how the rail itself it suspended;

FIGURE 8 is an enlarged perspective view of a short length of conveyor rail and screw; and FIGURE 9 is a diagram of an electric control circuit for a portion of the system.

Figure 1:
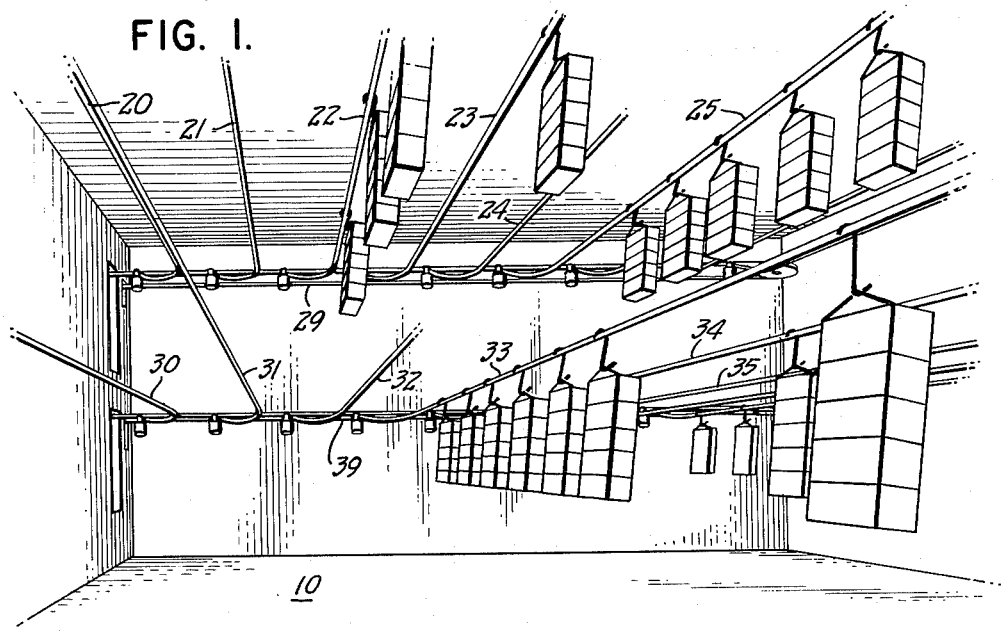
FIGURE 1 is a perspective view from inside an ice cream hardening room looking toward the entrance end and showing portions of an automatic conveyor system embodying features of the invention.

The automatic conveyor system shown in FIGURE 1 is illustrated in conjunction with an ice cream hardening room 10 which is maintained at a very cold or sub-freezing temperature by refrigeration equipment which is not shown. Spaced apart in parallel relationship in an upper tier and running the length of the room are storage conveyors or sections 20, 21, 22, 23, etc. Each of these upper conveyors has its product-receiving or input end alongside an input conveyor which carries articles from an outside production room into the hardening room where they are transferred onto the selected one of the upper storage conveyors. A similar plurality of parallel spaced lower storage conveyors or sections 30, 31, etc. are in a lower tier and run the length of room 10, these lower conveyors being fed by an input conveyor 39.

Figure 2:
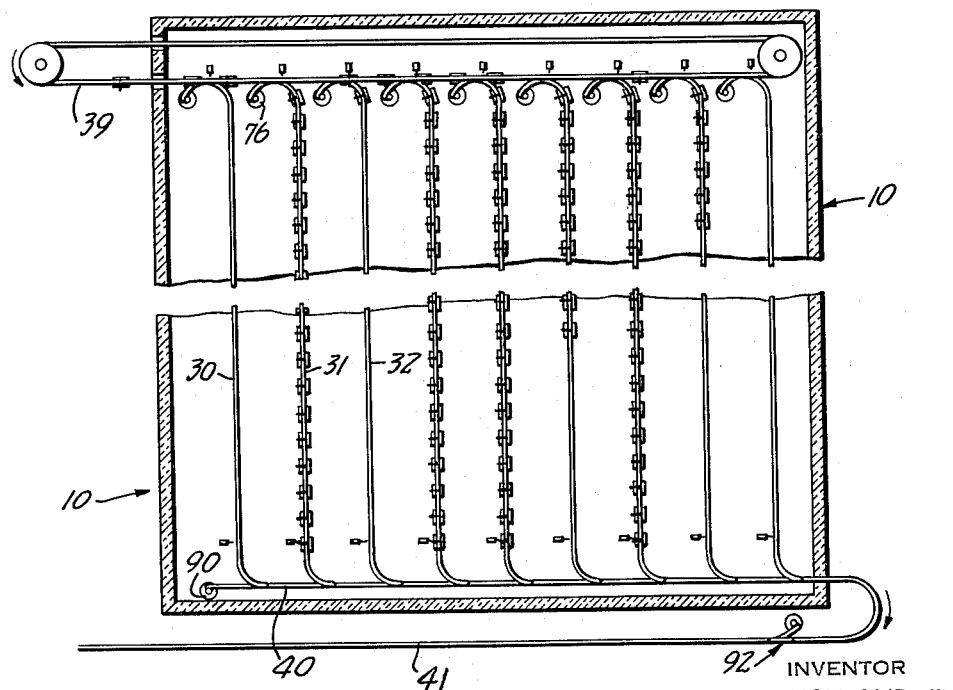
FIGURE 2 is a plan view of the hardening room and conveyor system.

As shown best in FIGURE 2, which shows the lower tier of storage conveyors, input conveyor 39 is of the endless type and runs from outside room 10 into it and then back out. Conveyor 39 is suspended from above, see FIGURE 3, and carries articles into room 10 on hooks which pass just above the product-receiving or input ends of storage conveyors 30, 31, etc. As the article laden hooks on input conveyor 39 move single file past the ends of the storage conveyors, each hook will be switched onto one storage conveyor which is selected automatically, depending upon the kind or class of articles which that hook carries. Thus, for example, if all the hooks coming into room 10 on conveyor 39 carry vanilla ice cream packages and these are to be stored on conveyor 31, these hooks will automatically be shunted onto conveyor 31 one after another, the latter being driven to advance the hooks individually at evenly spaced distances regardless of the original spacings of the hooks on input conveyor 39. This loading of conveyor 31 will continue until it is full, whereupon it will automatically be blocked off, and another conveyor in the tier then is selected and loaded with vanilla packages. If the hooks carry a variety of different kinds of ice cream, only the hooks carrying vanilla packages will be transferred to conveyor 31. Other packages, such as those containing strawberry or chocolate ice cream, which are interspaced among the vanilla packages on input conveyor 39, will automatically pass conveyor 31 and be sent to other respective storage conveyors chosen for them. The designating of the various conveyors to receive the particular kinds of ice cream may be readily changed to satisfy changing operating conditions. Thus, the classifying and storing of articles in room 10 is completely automatic and is accomplished according to a very flexible plan.

Referring to FIGURE 2, the product-discharge or exit ends of the lower storage conveyors leads to a single output conveyor 40 onto which the articles suspended on storage conveyor can be transferred and led from room 10 as desired. Conveyor 40 is similar in structure to the storage conveyors, all of which embody features of the invention illustrated herein and discussed more fully below. An output conveyor, identical with conveyor 40, is provided for the upper tier of storage conveyors.

FIGURE 3 shows more in detail the structure of input conveyor 39 and of the storage conveyors which are illustrated as conveyor 31. Permanently suspended from and evenly spaced along conveyor 39 are hooks 50 which are moved by the conveyor to the right in room 10, and each of hooks 50 is adapted to support an article bearing hook, such as, hooks 52 and 54. As hooks 50 move to the right, they carry the article hooks over the product receiving or input ends of the storage conveyors. These ends of the storage conveyors are positioned so that they lie just beneath the path of hooks 50 and will catch the article hooks as and when they are released from hooks 50. Assume now that hook 52 is to be transferred to storage conveyor 31, when this hook has advanced to the relative position shown in FIGURE 3, a barrier in front of its line or path of travel prevents the hook from moving further to the right. As the conveyor 39 continues to move, this barrier cams the hook 52 back and down off of conveyor hook 50 which continues to move to the right. Hook 52 slides down and is thus deposited (see FIGURE 4) on conveyor 31 which moves it away from conveyor 39. Each time that a hook 52, 54 is deposited upon the input end of conveyor 31, the conveyor operates to advance the hook a predetermined distance along the conveyor. The conveyor then stops until another hook is received. This maintains an even spacing between the hooks suspended from conveyor 31 even though the hooks are received at irregular intervals. The electric circuit controlling the conveyors will be described below.

Conveyor 31, which is shown in cross-section in FIGURE 7 and in perspective in FIGURE 8, includes a stationary rail 60 having a lower stiffening web 62, and an upper open O or somewhat U shaped channel 64 within which is recessed and snugly received a rotatable flexible screw 66. Channel 64 substantially encircles screw 66, but the screw is exposed by an open slot 67 at the top. The screw is positively held within the rail even though the rail and screw extends around curves of small radius to form fairly sharp angles, as shown in FIGURE 3. The top outer surface of rail 60 is curved at 68 on a radius to a point near the middle of web 62. This curved surface 68 provides a hardened sliding track for the article hooks 52, 54 which are driven along surface 68 by engagement with the helical thread or shoulder of a rotating screw 66. For this purpose, each hook 52, 54 is provided with a die stamped tab 70 which extends down into the slot 67 in rail 60 and engages the thread or shoulder on screw 66. This tab does not support the weight of the hook but bears only against the side of the helical outer winding on shaft 66. Thus the shaft is not forced against the rail at any local point and is free to rotate under maximum load. Rail 60 is of aluminum extruded in long continuous lengths and is rigid with hardened top surfaces. Screw 66 is a multi-strand flexible shaft with an external helical thread, and is quite flexible longitudinally so that it rotates freely throughout the curved and straight portions of the rail. However, the screw shaft is torsionally very stiff so that it does not twist as a result of the turning action.

As shown best in this FIGURE 7, each of the article carrying hooks 52, 54 is provided with a top loop 72 by which it hangs as it enters room 10 from one of the fixed hooks 50 on input conveyor 39. Each hook 52, 54 is also provided with a set of code fingers or pins 74 which can be set in accordance with a predetermined code to mechanically engage any chosen one of a number of switches to cause the hook 52, 54 to be cammed off its supporting hook 50 and to be deposited upon a selected one of the storage rails.

The screw or flexible shaft 66 (FIGURE 3) of storage conveyor 31 is driven from the input end of the conveyor by a motor 76 rigidly mounted upon rail 60 and driving screw 66 by a right-angle worm drive. Motor 76 rotates screw 66 in the proper direction to cause the screw thread to advance the article hooks forward toward the discharge end of conveyor 31, i.e. to the right in FIGURE 3. Rail 60 is suspended from vertical hangers on struts 60 attached to and extending from the ceiling and each carrying a hanger 82 to which the rail is rigidly attached. Hangers 82 are formed by extruding a continuous channel member having a cross-sectional shape as shown in FIGURE 7, and then cutting the channel member in lengths to form the hangers. Each hanger is hooked onto the web of rail 60 and then wedged tightly to it by a taper pin 84 driven in the slot 85 between the rail and the bracket.

The output or discharge end of conveyor 31 (FIGURE 5) is curved tangentially above and thence downwardly toward the top of output conveyor 40 which is similar in structure to conveyor 31. Extending forwardly beyond the end of the rail 60 are two guide arms 86 having a top sliding surface 87 of the same curvature as surface 68 of rail 60. Screw 66 extends beyond the end of rail 60 and is bent downwardly beyond, and the screw terminated in a thrust bearing 88 rigidly fastened to the rail and serving to maintain substantial tension on screw 66 throughout its length. This tension materially reduces the torsional "play" or twist in the screw and gives improved performance and less wear between screw and rail. The tension also pre-stresses rail 60 for greater strength.

The projecting ends of guide arms 86 terminate in a hinged guide foot 89 whose lower end fits loosely over the rail of conveyor 40 and whose upper end is hinged to the lower ends of arms 86. Thus a hook passing on conveyor 40 beneath the foot to the right can lift it and pass without obstruction. Conversely a hook sliding down arms 86 is guided gently and positively onto conveyor 40 by the foot. Each of the storage conveyors is identical with conveyor 31.

Output conveyor 40 (FIGURE 2) is driven from the left by a motor 90, similar to motor 76, which rotates the screw in this conveyor to propel the hooks to the right. This conveyor may extend a considerable distance and under such circumstance it is desirable to divide the conveyor into two or more serially connected sections. Thus, after conveyor 40 has passed out of room 10 and turned a corner (FIGURE 6), there is provided a crossover junction 92 to an extension conveyor 41. Parts of the conveyors 40 and 41 corresponding to parts of conveyor 31 are correspondingly numbered.

The discharge end of the conveyor 40 lies to the right of junction 92 and the input end of the conveyor 41 lies to the left. Screw 66 in conveyor 40 terminates in a thrust bearing 88 and screw 66 in the conveyor 41 is driven by a motor 76. The end of rail 60 of conveyor 40 lies somewhat above the end of rail 60 of conveyor 41, the two being joined by the slide rails 94 having a curved top surface 95 the same as surface 68. As hooks are moved to the left, they lose contact with screw 66, which curves down, and then slide by gravity onto conveyor 41 where they will immediately come into engagement with its screw 60. This screw extends behind slide rails 94 and is curved as shown to prevent interference between the hooks 52, 54 and motor 76. It will be appreciated also that for this reason all hangers 82 lie to the left of the rail or on the right-hand side looking forward along the respective conveyors.

Article hooks 52, 54 moving down slide rails 94 are urged along by gravity, but the speed at which these hooks slide is controlled by adjusting the distance between the rails 94 at their mid-point by an adjusting screw 96. If the rails are spread farther apart, the hooks will then descend more slowly; conversely, if the rails 94 are drawn together the hooks will descend faster.

As discussed above, when the article hooks enter room 10 suspended from cam hooks 50, the article hooks 52, 54 energize selected electric switches in accordance with the setting of the code fingers 74 carried by them, and this causes each hook to be switched to the appropriate storage conveyor. One such switch 100 is shown in FIGURE 3 positioned opposite conveyor 31. When one of the article hooks 52 having the selected code arrangement of fingers 74 for switch 100 moves along conveyor 39, the switch is closed by the code finger or fingers. This energizes the electric solenoid 102 (FIGURE 4) which moves a bar 104 across the path of the article hook 52 and cams it off of its hook 50, as explained above. At the same time, conveyor 31 is started and runs for a short time to move the just deposited article hook forward for a given distance.

Referring to FIGURE 9, solenoid 102 is energized through the wires 106 from a suitable source of power, being connected in series with the source by switch 100, normally open, and the switch 108. The latter (FIGURE 5) is positioned at the end of conveyor 31 and is held open when an article hook is at the end of the conveyor, this being the case when the conveyor is filled with hooks. Thus (see FIGURE 9) solenoid 102 will not operate when switch 108 is open, this indicating that conveyor 31 is filled, and article hooks therefore cannot be deposited on it from conveyor 39.

Assuming, however, that conveyor 31 is not filled and that switch 108 is closed as shown in FIGURE 9, whenever switch 100 is closed, a relay having a coil 110 is energized to close switch 112 and start motor 76 on conveyor 31. Switch 112 is delayed in opening for a predetermined period by the dash-pot 114 and during this time the just deposited hook will be advanced on the conveyor by the desired distance. Switch 112 then opens and the cycle of operation repeats with the next hook, and so on, until the conveyor is filled and switch 108 opens. Thereafter, no hooks will be accepted on this conveyor as long as it is filled.

To empty conveyor 31, its motor is energized independently by a manually controlled switch 116. At the same time, it is to be understood, output conveyor 40 is set in operation by a separate switch (not shown). Each storage conveyor in both tiers has associated with it a circuit such as shown in FIGURE 9.

It will now be appreciated that the system above described provides completely automatic warehousing of articles with complete flexibility in their classification, storage and withdrawal. Any number of storage conveyors can be used, depending upon the desired capacity of the system. The conveyors, such as conveyor 31, require a minimum of attention, occupy very little space, and can be installed almost anywhere. Transfer from one conveyor to another is simple and easy and great savings in labor costs can be realized. The system is extremely rugged and reliable.

As many possible embodiments may be made of the mechanical features of the above invention and as the art herein described might be varied in various parts, all without departing from the scope of the invention, it is to be understood that all matter hereinabove set forth, or shown in the accompanying drawings are to be interpreted as illustrative and not in the limiting sense.

I claim:

1. An automatic conveyor storage system comprising a continuously-operating, power-driven input conveyor adapted to carry in single-file a plurality of article carriers, a plurality of intermittently-operated independently-controlled power storage conveyors arranged in spaced-apart relationship transversely to said input conveyor, the article moving force of each storage conveyor being a rotatable helical screw engageable by the article carrier, means providing for automatic transfer of article carriers from said input conveyor to a selected storage conveyor, means to start operation of the selected storage conveyor upon transfer of an article carrier thereto, and means automatically to stop operation of said selected storage conveyor after a predetermined definite time has elapsed whereby article carriers received on the storage conveyors are substantially evenly spaced apart.

2. The conveyor system of claim 1 in combination with means for preventing transfer of article carriers to and start-up of each storage conveyor when it becomes filled.

References Cited in the file of this patent

UNITED STATES PATENTS

| | | |
|---|---|---|
| 451,602 | Richardson | May 5, 1891 |
| 1,122,000 | Von Hassel | Dec. 22, 1914 |
| 1,511,011 | Adkins et al. | Oct. 7, 1924 |
| 1,554,765 | Shaffer | Sept. 22, 1925 |
| 1,730,382 | Posnick | Oct. 8, 1929 |
| 1,875,966 | Webb | Sept. 6, 1932 |
| 1,991,818 | Nissen | Feb. 19, 1935 |
| 2,013,141 | Frost et al. | Sept. 3, 1935 |
| 2,038,824 | Byrnes | Apr. 28, 1936 |
| 2,124,444 | Boumans et al. | July 19, 1938 |
| 2,173,952 | Ranney | Sept. 26, 1939 |
| 2,344,155 | McBride et al. | Mar. 14, 1944 |
| 2,404,885 | Pile | July 30, 1946 |
| 2,614,506 | Mullerheim | Oct. 21, 1952 |
| 2,620,917 | Dahlberg | Dec. 9, 1952 |
| 2,786,427 | Reich | Mar. 26, 1957 |

FOREIGN PATENTS

| | | |
|---|---|---|
| 996,529 | France | Dec. 20, 1951 |